Patented Oct. 25, 1938

2,134,602

UNITED STATES PATENT OFFICE 2,134,602

METHOD AND MEANS FOR CLEANSING AND LUBRICATION

Jacob M. Cohen, Washington, D. C.

No Drawing. Application October 9, 1937, Serial No. 168,283

6 Claims. (Cl. 184—1)

The present invention relates to a method and means for the simultaneous cleaning and lubrication of apparatus or machines which include a multiplicity of small moving parts, such as typewriters, calculating machines, or the like.

It is the object of the present invention to provide a method and means which will accomplish the cleaning and lubrication of typewriters or the like rapidly, effectively, and without disassembling the machine, thereby preserving the original factory adjustment of the parts of the machine.

According to the present invention, a cleansing liquid having a suitable lubricant incorporated therein is caused to impinge violently upon the machine and all of its parts, with the result that all of the dirt and grease is thoroughly dissolved and washed away or removed by the mechanical effects of the force of the impinging liquid and at the same time the liquid together with the lubricant enters all of the crevices of the machine and of the parts thereof, thereby bringing the lubricant directly to all points that require lubrication. The cleansing liquid employed in the present process is of a type which is readily miscible with the lubricant commonly employed for the lubrication of typewriters or dissolves such lubricant; in addition, the cleansing liquid is preferably a solvent cleaner and is volatile and noninflammable.

The degree of volatility of the cleaning liquid employed in the present process may vary considerably over a wide range; provided, however, that its volatility should not be so great as to vaporize the liquid when it is sprayed or atomized by means of air at considerable pressure. On the other hand, its volatility should be high enough so that the skin or coating of the liquid that remains upon the machine and its parts after it has been treated should be readily volatilized.

In the present process the cleaning liquid, together with the lubricant contained therein, whether in suspension, emulsion, or solution, is caused to impinge upon the typewriter and its parts in the form of a spray or mist formed by atomization by air under high pressure, such as from fifty to one hundred pounds per square inch. If the cleansing liquid is too volatile, the spray or mist formed at this high pressure of air may result in excessive volatilization and vaporization of the cleansing liquid, with the consequence that instead of a stream of more or less finely divided liquid being impinged upon the machine and its parts, there will merely be a stream of gases and vapors, with perhaps the drops of lubricant dropping out of it. This process, while effective for some purposes, is not desirable herein for the reason that it will not bring the lubricant so effectively into all of the crevices and to all points that require lubrication and also for the reason that the cleansing fluid will escape into the atmosphere and the recovery thereof becomes a more complicated procedure. In the present process, therefore, the cleansing liquid is of such a nature and composition that while some volatilization will necessarily take place during the spraying operation, by far the major proportion of the cleansing liquid remains in liquid form and by virtue of the high pressure of the air and the high velocity of the liquid particles caused by the atomization, the liquid particles impinge violently upon the machine and its parts with the result that all dirt, grease, and the like, are thoroughly removed from the machine and its parts. Simultaneously, the liquid is forced into all crevices and all portions of the machine that require lubrication.

In the operation of the present process, a nozzle is employed which is so shaped and designed that it can be brought into the interior of the typewriter or similar machine so that the mouth of the nozzle can be brought into close proximity with the parts of the machine that require cleansing and lubrication. By the proper manipulation of the nozzle with respect to the machine and parts thereof, the liquid is caused to impinge upon the various parts of the machine with the desired degree of violence. The force of the stream upon the various parts may be regulated or varied either by controlling or varying the pressure of the air and also by varying somewhat the distance of the mouth of the nozzle from the parts being sprayed and cleansed.

As a result of the process thus far described, the machine has been thoroughly cleaned and a lubricant has been conveyed to all parts of the machine. The small amount of cleansing liquid that still remains as a coating on the machine and its parts may be permitted to volatilize by standing at room temperature, whereas the lubricant remains within the machine.

The properies and qualities of the cleansing fluid required and employed in the present process will now become apparent. Such liquid must have a solvent effect with relation to dirt and grease, and still must be of such a nature as not in any way to injure the machine or the ornamental coatings on the different parts of the machine. It must be of such a nature that the high pressure spray employed in the process should remain in its liquid state and still the liquid must be sufficiently volatile so that the thin coating thereof which remains upon the machine and its parts could be readily volatilized without any deleterious effect upon the lubricant which is employed.

The preferred composition employed in the present process is a mixture of carbon tetrachloride, a petroleum distillate solvent, or solvent naphtha. The preferred portions are two parts of carbon tetrachloride to one part of the distillate solvent or solvent naphtha. This mixture retains the non-inflammability of carbon tetrachloride and the volatility of the mixture is reduced substantially below that of the carbon tetrachloride so that it is highly suitable for the present purposes. It will be understood, however, that the proportions of these two ingredients or similar ingredients may be varied considerably, provided that these portions are such as to render the mixture noninflammable and sufficiently volatile to permit the ready volatilization thereof after the completion of the cleansing and still to prevent the substantial volatilization of the liquid during the spraying operation.

The lubricant employed depends partly upon the type of machine which is being operated on. Where the process is employed for the cleansing and lubrication of typewriters a suitable spindle oil is employed which is readily soluble or miscible with the cleansing liquid described.

In the present process two to four ounces of spindle oil for each gallon of cleansing fluid gives the best results in that it provides a sufficient quantity of such lubricant for the proper lubrication of the machine and still does not form any such oil coating on the machine as to cause it to drip or to yield a sticky surface.

The ingredients of the cleansing liquid together with the lubricating oil are mixed and short violent stirring of the mixture brings about a uniform mixing of the ingredients. In the cleansing and lubrication of certain machines falling generally in the class of typewriters and calculating machines, it sometimes becomes necessary to employ a larger proportion of lubricating oil and a somewhat heavier lubricating oil than that used in the lubrication of the ordinary typewriting machine. In such cases, the process is conducted in the same manner as thus far described, except that this is followed by subjecting the entire machine to a forced draft of air of 150° to 175° F. This draft of heated air serves the function of mechanically removing from the exposed parts of the machine any adherent cleansing fluid or lubricant while at the same time the lubricant is somewhat thinned, thereby rendering it more fluid so that it more readily penetrates all crevices and all points that require lubrication.

Whereas in the methods of cleaning and lubricating typewriters or similar machines heretofore employed, the operator had to substantially disassemble many parts and some times the entire machine, in the present process, it is sufficient to remove only the platen, and, in some cases to remove the side walls or the like. This having been accomplished the operator merely places the typewriter in a sink designed for the purpose and by manipulating both the typewriter and the nozzle, the high pressure spray of the combined cleansing liquid and lubricant is caused to violently impinge upon every part of the machine with the result that the major portion of the dirt is dislodged by the violence of the stream and the remainder of the dirt is dissolved and washed away by this stream. The operator manipulates and exposes every part of the machine to the stream while at the same time the nozzle is manipulated with relation to every part of the machine. The liquid is violently forced into all of the crevices and all of the spaces between moving and adjoining parts, with the result that all accumulated dirt and grease is removed from such crevices while a sufficient quantity of the lubricant remains within said crevices. After this is completed, the machine is permitted to stand for an hour or two at which time substantially all of the cleansing fluid has volatilized and the machine is ready for use. In other cases where it is desired to complete the process without any further delay or where a heavy lubricating oil is employed, or where the cleansing fluid employed is such that it does not readily volatilize on standing, the machine is subjected for only a minute or two to a violent and rapid stream of heated air as described. The rate of flow of this air may be from ten to twenty miles per hour.

In the lubrication of some machines of the class described herein, I employ eight ounces of the lubricating oil to each gallon of cleanser. In such cases a substantial amount of oil remains as an adherent coating on the machine and parts thereof. Such machines are subjected to treatment by a rapidly moving stream of heated air described above. The rapid flow of the air carries away the surface oil which had been thinned by the heat so that the exposed parts of the machine remain substantially dry. Whereas the oil which had been trapped in the crevices and spaces between adjacent parts penetrates further into such crevices by reason of the temporary reduction in the viscosity of the oil caused by the stream of heated air.

Having thus described my invention, I claim:

1. The method of simultaneous cleansing and lubricating of typewriters or the like which comprises mixing a suitable oil lubricant with a cleansing liquid miscible therewith, forming a high pressure spray of such mixture, subjecting the typewriter and all its parts in assembled condition to violent impingement by said high pressure spray, whereby the typewriter and all its parts are cleansed, and the mixture penetrates and carries its lubricant to all bearings of the typewriter in quantities sufficient to lubricate the same and without leaving any substantial deposits of oil on other parts of the machine, and vaporizing the cleansing liquid.

2. The method of simultaneous cleansing and lubricating of typewriting machines or the like which comprises mixing a suitable oil lubricant with a volatile noninflammable cleansing liquid miscible therewith, forming a high velocity high pressure spray of such mixture and subjecting the machine in its assembled condition to violent impingement by said spray and thereby removing from the machine all dirt and causing the lubricant to penetrate into all bearings and crevices of the machine in quantities sufficient to lubricate the machine and without leaving any substantial deposit of oil on other parts of the machine; the lubricant content of the mixture being from 2 to 8 ounces per gallon of cleansing liquid.

3. The method of simultaneous cleansing and lubricating of typewriting machines or the like which comprises preparing a mixture of a mineral hydrocarbon lubricant, a mineral hydrocarbon solvent and a volatile noninflammable chlorinated hydrocarbon, forming a high-velocity spray of such mixture, and subjecting the machine and all its parts to the action of such spray, thereby removing all extraneous matter from the machine and its parts and causing the lubricant to penetrate to all remote parts thereof and depositing lubricant in all bearings of the machine in quantities sufficient to lubricate the same, the volatile and the solvent action of the mixture serving to reduce the deposit of the lubricant on other parts of the machine to a minimum.

4. The method of simultaneous cleansing and lubricating of typewriting machines or the like which comprises preparing a mixture of a mineral hydrocarbon lubricant, a mineral hydrocarbon solvent and a volatile noninflammable chlorinated hydrocarbon, forming a high velocity spray of such mixture, subjecting the machine and all its parts to the action of such spray, thereby removing all extraneous matter from the machine and its parts and causing the lubricant to penetrate to all bearings thereof in quantities sufficient to lubricate the same, and subjecting the machine to the action of a heated stream of air to remove excess oil and cleansing liquid from the machine.

5. The method of simultaneous lubricating and cleansing of a machine, having a great multiplicity of moving parts in close assembly without disassembling the same, comprising the step of subjecting the machine and its parts to treatment by the violent impingement of finely divided particles of a volatile, noninflammable cleansing liquid containing a lubricant in proportions of 2 to 8 ounces per gallon, causing the liquid to penetrate into and between all bearings thereof, and causing a deposit of lubricant on the bearing surfaces thereof in quantities sufficient to lubricate the same, and volatilizing the cleansing fluid.

6. The method of simultaneous cleansing and lubricating of machines of the type having a multiplicity of relatively movable parts, which comprises preparing a mixture of a mineral hydrocarbon solvent, a volatile noninflammable chlorinated hydrocarbon, and a relatively small amount of a mineral hydrocarbon lubricant, forming a high velocity spray of such mixture, subjecting the machine in its assembled state to the action of such spray, thereby removing all extraneous matter from the machine and causing the lubricant to penetrate to the bearings and crevices of the machine, and vaporizing the cleansing liquid adhering to the machine; the chlorinated hydrocarbon serving to render the liquid and vapors noninflammable, while the hydrocarbon solvent serves to reduce the volatility of the spray; the mineral hydrocarbon and chlorinated hydrocarbon jointly serving as a vehicle for the lubricant and for carrying the same onto and between the bearing surfaces and the high velocity of the spray serving to introduce into such bearing surfaces sufficient quantities of the mixture to deposit lubricant therein in quantities sufficient to lubricate the same.

JACOB M. COHEN.